US006551678B1

(12) United States Patent
O'Brien et al.

(10) Patent No.: US 6,551,678 B1
(45) Date of Patent: Apr. 22, 2003

(54) DEEP EMBOSSED TILE DESIGN POSTFORMABLE HIGH PRESSURE DECORATIVE LAMINATE AND METHOD FOR PRODUCING SAME

(75) Inventors: Kevin Francis O'Brien, Cincinnati, OH (US); Robert Paul Fairbanks, Cincinnati, OH (US); Kenneth Allan Nilsson, Cincinnati, OH (US)

(73) Assignee: Formica Corporation, Warren, NJ (US)

( * ) Notice: Subject to any disclaimer, the term of this patent is extended or adjusted under 35 U.S.C. 154(b) by 0 days.

(21) Appl. No.: 09/414,937

(22) Filed: Oct. 9, 1999

(51) Int. Cl.[7] .................................................. B32B 3/30

(52) U.S. Cl. ........................... 428/44; 428/45; 428/156; 428/161; 428/163; 428/167

(58) Field of Search ................................. 428/161, 163, 428/167, 156, 44, 45; 156/219; 11/220

(56) References Cited

U.S. PATENT DOCUMENTS

| | | | | |
|---|---|---|---|---|
| 3,373,068 A | | 3/1968 | Grosheim et al. | 156/219 |
| 3,718,496 A | | 2/1973 | Williard | 117/10 |
| 3,860,470 A | | 1/1975 | Jaisle et al. | 156/85 |
| 4,092,199 A | | 5/1978 | Ungar et al. | 156/222 |
| 4,093,766 A | | 6/1978 | Scher et al. | 428/165 |
| 4,339,489 A | * | 7/1982 | Barker et al. | 428/167 |
| 4,374,866 A | | 2/1983 | Blahna et al. | 427/10 |
| 4,376,812 A | * | 3/1983 | West | 428/165 |
| 5,112,671 A | * | 5/1992 | Diamond et al. | 428/156 |
| 5,723,221 A | * | 3/1998 | Brooker et al. | 428/469 |

FOREIGN PATENT DOCUMENTS

JP 03153350 A * 7/1991

OTHER PUBLICATIONS

Co–pending U.S. application No. 09/134,234.

* cited by examiner

*Primary Examiner*—Shrive P. Beck
*Assistant Examiner*—Elena Tsoy
(74) *Attorney, Agent, or Firm*—Meyer Brown Rowe & Maw

(57) ABSTRACT

A deep embossed high pressure decorative laminate having a plurality of integral tiles with various surface textures bordered by deep embossed portions. Each tile of the laminate has a peripheral thickness greater than the thickness of the non-peripheral portions of the tile. Preferably, each tile has a concave profile along its upper surface when viewed in cross section. A method of producing artwork necessary for the deep embossed high pressure decorative laminate of the present invention comprises assembling a first layer of fibrous sheets impregnated with a thermosetting resin, a second layer comprising a plurality of adjacent tiles comprising a plurality of fibrous sheets impregnated with a thermosetting resin, wherein the tiles were previously pressed and heated, and a third layer comprising a plurality of shims. The assembly is then pressed and heated against a rigid substrate whereby the second layer forms a substantially convex shape on the upper surface of each tile, thus imparting substantially concave impressions on the first layer. The first layer is subsequently removed from the second and third layers, and grooves are formed in the first layer, preferably by machining.

5 Claims, 2 Drawing Sheets

DEEP EMBOSSED TILE DESIGN POSTFORMABLE HIGH PRESSURE DECORATIVE LAMINATE AND METHOD FOR PRODUCING SAME

FIELD OF THE INVENTION

This invention relates generally to high pressure decorative laminates and methods for producing same, and more specifically, laminates having a deeply textured surface displaying a tile design.

BACKGROUND OF THE INVENTION

Typically deeply textured embossed high pressure decorative laminates are produced with an overall thickness greater than those with more planar textures, such that the areas of deepest embossment have a thickness about the same as that for conventionally textured high pressure decorative laminates. While this avoids the problem of texture embossment punch-through and weakening of the laminate structure, with associated breakage, etc., the necessary increased thickness of such laminates detracts from their postformability. As such, it is often not possible to postform these laminates to the relatively tight radii of conventional kitchen countertop profiles, or other demanding postforming applications, and therefore restricting their use to either general purpose flatstock applications, or postforming applications with less aesthetically pleasing larger radii bends. For the aforementioned reasons, a deeply embossed tile design high pressure decorative laminate, with commercially acceptable physical properties and postforming characteristics, has been heretofore precluded.

High pressure decorative laminates have been used as a surfacing material for many years, in commercial and residential applications, where pleasing aesthetic effects, in conjunction with functional behavior, such as superior wear, heat and stain resistance compared to alternative surfacing materials, have been desired. Typical applications include, but are not limited to, furniture, kitchen countertops, table tops, store fixtures, bathroom vanity tops, cabinets, wall paneling, partitions, and the like. However, historically, high pressure decorative laminates have not been successfully used to replace "natural" ceramic tile for applications such as kitchen countertops, bathroom vanity tops, or shower and tub surrounds, where the "real" tile look is desired, even though high pressure decorative laminate offers several distinct advantages over ceramic tile, including a naturally antibacterial, antifungal and mold resistant surface, ease of installation, ease of cleaning, lower cost, warmth to the touch, and more forgiveness with breakable objects such as glassware and dinnerware. A natural ceramic tile installation consists of 5% or more porous grout area, which is easily stained and readily promotes bacterial, fungal and mold growth, which is becoming ever more of a household and business concern. Therefore, the need exists for a postformable, high pressure decorative laminate with a pleasing, deep textured tile design simulating the look and feel of natural ceramic tile without the deficiencies noted above.

High pressure decorative laminates can generally be classified by their decorative surface design as being either a uniform solid color, or a printed pattern, whether a woodgrain, stone-like or abstract design. Each type of high pressure decorative laminate can also be classified as to its surface finish, which in conjunction with its color or pattern, contributes to the overall decorative surface design, structure and aesthetics, as will be discussed in more detail below. High pressure decorative laminates can also be classified by their intended application as defined by the industry's governing body, the National Electrical Manufacturers Association (NEMA) in there standards publication LD 3-1995. Of particular interest is the "postforming type", which is defined as "a high pressure decorative laminate (HPDL) similar to the general-purpose type, but is capable of being thermoformed under controlled temperature and pressure" after its initial manufacture, which is well understood by those versed in the art.

High pressure decorative laminates are generally comprised of a decorative sheet layer, which is either a solid color or a printed pattern, over which is optionally placed a translucent overlay sheet, typically employed in conjunction with a print sheet to protect the print's ink line and enhance abrasion resistance, although an overlay can also be used to improve abrasion resistance of a solid color as well. A solid color sheet typically consists of alpha cellulose paper containing various pigments, fillers and opacifiers, generally with a basis weight of about 50 to 120 pounds per 3000 square foot ream. Similarly, print base papers are also pigmented and otherwise filled alpha cellulose sheets, usually lightly calendered and denser than solid color papers, and lower in basis weight at about 40–75 pounds per ream, onto which surface is rotogravure or otherwise printed a design using one or more inks. Conversely, overlay papers are typically composed of highly pure alpha cellulose fibers without any pigments or fillers, although they can optionally be slightly dyed or "tinted", and are normally lighter in weight than the opaque decorative papers, in the range of 10–25 pounds per ream.

Typically, these overlay and decorative print and solid color surface papers are impregnated, or "treated", with a melamine-formaldehyde thermosetting resin, which is a condensation polymerization reaction product of melamine and formaldehyde, to which can be added a variety of modifiers, including plasticizers, flow promoters, catalysts, surfactants, release agents, or other materials to improve certain desirable properties, as will be understood by those versed in the art. As with melamine-formaldehyde resin preparation and additives thereto, those versed in the art will also appreciate that other polyfunctional amino and aldehydic compounds can be used to prepare the base resin, and other thermosetting polymers, such as polyesters, may be useful as the surface resin for certain applications, but use of a melamine-formaldehyde resin is preferred. Optionally, an untreated decorative paper can be used in conjunction with a treated overlay, if the overlay contains sufficient resin, such that during the laminating process heat and pressure consolidation, there is adequate flow of the resin from the overlay to contribute to the adjacent decorative layer, so as to effect sufficient interlaminar bonding of the two, as well as bonding of the decorative layer to the core. The equipment used to treat these various surface papers is well known to those versed in the art. The papers are normally treated to controlled, predetermined resin contents and volatile contents; the optimum levels will be well understood by those versed in the art, with typical resin contents in the ranges of 64–80%, 45–55% and 35–45% for overlay, solid color and print (unless used untreated) papers respectively, and all with volatile contents of about 5–10%.

The surface paper of a high pressure decorative laminate is simultaneously bonded to the core, which usually is comprised of a plurality of saturating grade kraft paper "filler" sheets, which have been treated or impregnated with a phenol-formaldehyde resin, which also simultaneously fuse and bond together during the laminating process, forming a consolidated, multi-lamina integral assembly. Again, those versed in the art will appreciate that a variety of modifiers such as plasticizers, extenders and flow promoters can be added to the phenol-formaldehyde resin, that other phenolic and aldehydic compounds can be used to prepare the base resin, or other types of thermosetting resins such as epoxies or polyesters may be used, although a phenol-formaldehyde resin is preferred. In addition, other materials such as linerboard, fabric, glass, or carbon fiber may be used for the filler plies, but a saturating grade kraft paper and other modified kraft papers are presently preferred, typically with a basis weight of about 70–150 pounds per ream. The resin preparation and filler treating methodologies are also well known to those versed in the art.

During the laminating or pressing operation, the various surface and filler sheets are cured under heat and pressure, to fuse and bond them together, consolidating them into an integral mass. Typically, this process is accomplished in a multi-opening, flat bed hydraulic press between essentially inflexible, channeled platens capable of being heated and subsequently cooled. While other types of press equipment can be used to produce high pressure decorative laminates, for example a continuous double belt press, a single or limited opening "short cycle" press, or an isothermal "hot discharge" press, a conventional multi-opening press is most suited to the practice of the present invention.

Typically, back-to-back pairs of laminate assemblies, consisting of a plurality of filler sheets and one or more surface sheets, are stacked in superimposed relationship between rigid press plates, with the surfaces adjacent to the press plates. Such press plates are typically made of a stainless steel alloy such as AISI 410, and can have a variety of surface finishes, which they either impart directly to the laminate surface during the pressing operation, or they are used in conjunction with a non-adhering texturing/release sheet between the laminate surface and the plate, which will impart a finish to the laminate surface as well. Such texturing/release sheets, for example paper backed aluminum foil, or a variety of polymer coated papers, are commercially available from a variety of suppliers.

Several pairs of laminate assemblies are usually interleaved between several press plates to form a press pack (or book), which is then inserted, by means of a carrier tray, into an opening or "daylight" between two of the heating/cooling platens of the multi-opening, high pressure flat bed press. The press platens are typically heated by direct steam, or by high pressure hot water, the latter usually in a closed-loop system, and water cooled. The laminate pairs between the press plates are usually separated from each other by means of a non-adhering material such as a wax coated paper, or biaxially oriented polypropylene film, which are commercially available, or the backmost face of one or both of the laminates' opposed filler sheets in contact with each other is coated with a release material such as a wax or fatty acid salt. In either case, after the pressing operation has been completed and the press pack removed from the press, the press plates are removed sequentially from the press pack build-up, and the resultant laminate doublets separated into individual laminate sheets. In a separate operation, these must then be trimmed to the desired size, and back sanded so as to improve adhesion during subsequent bonding to a substrate and other fabrication.

A typical press cycle, once the press is loaded with one or more packs containing the laminate assemblies and press plates, will consist of closing the press to develop a specific pressure of about 1000–1500 psig, heating the packs to about 130–145 C., holding at that temperature for a predetermined time, and then cooling the packs to or near room temperature before discharging the packs from the press for separation. Those versed in the art should have a detailed understanding of the overall pressing operation, and will recognize that careful control of the degree of the laminate's cure, as well as its cure temperature, are critical in achieving the desired laminate properties, particularly its postformability, as are selection of the proper melamine-formaldehyde and phenol-formaldehyde surface and filler resins respectively, as well as the surface and filler paper properties.

Many types of press plates and texturing/release materials have been used to manufacture high pressure decorative laminate products with a wide variety of surface finishes. Historically, the earliest manufacture was confined to a smooth, reasonably glossy surface finish produced directly from a polished and buffed stainless steel press plate. This finish was sometimes reduced to a dull, essentially smooth, flat finish by rubbing the pressed laminate surface with a slurry of fine pumice. Later on, a lightly textured surface finish was produced by pressing the laminate surface against paper backed aluminum foil "caul stocks", e.g., kraft paper backed foil Caulstock #6 or litho paper backed foil Caulstock #13, placed between a flat stainless steel backing plate and the laminate, and later stripped off the laminate after the pressing operation. For economic reasons, the aluminum foils were subsequently replaced with specially coated texturing/release papers, usually with proprietary coating formulations based on substituted melamine resins and/or alkyd resins, such as St. Regis' (now Ivex) LC-55 and LC-58, and S. D. Warren's Transkote ETL, which produced essentially the same type finish and texture as did the aluminum foils, with a peak-to-valley depth of about 0.0005–0.001 inches. These types of textured finishes became extremely popular, nearly annihilating the glossy finish market, and are still produced in large quantity today, but now most commonly by the use of direct release shot peened or chemically etched stainless steel texturing plates.

Eventually, "low relief" embossed finishes were introduced, for example using the "heavy ink" method of U.S. Pat. No. 3,373,068 Grosheim et al., with peak-to-valley depths of about 0.003–0.005 inches. Still later, three-dimensional, deep textured or embossed laminates were manufactured, with peak-to-valley depths of 0.010–0.020 inch or more, for example by the methods of U.S. Pat. No. 3,718,496 issued to Willard and U.S. Pat. No. 3,860,470 issued to Jaisle et al., which are preferred and are incorporated herein by reference. Such laminates, of necessity to retain their mechanical strength, were usually produced substantially thicker than those with conventional "smooth" finishes, which adversely affected their postforming capability and often relegated such products to general purpose "flat stock" applications. This is especially true as the extent of embossing increased in severity.

Finally, the deep textured laminate technology evolved into efforts to faithfully simulate "natural" materials such as slate, marble, sandstone, pebbles, brick, cane, woven jute and hemp, leather, rough hewn and weathered timber, woodgrains, tile, and the like. To do so properly, and create a truly natural appearance and texture, registered embossed methods were developed in which the design color contrasts are in register with the peak and valley topography of the texture embossment itself. The earliest "overlay methods" of U.S. Pat. No. 4,092,199 issued to Unger, et al. and U.S. Pat. No. 4,093,766 issued to Scher, et al. relied on use of a pigmented, high flow melamine-formaldehyde resin impregnated overlay placed over a conventional solid color or printed pattern sheet to achieve the registered embossed effect. The later methods of U.S. Pat. No. 4,374,866 issued to Raghava and U.S. Pat. No. 4,376,812 issued to West replaced the pigmented melamine-formaldehyde resin treated overlay with a pigmented melamine-formaldehyde resin coating directly on the treated decorative paper of choice. However in the practice of the instant invention, for the manufacture of a registered embossed, deep grout, tile design high pressure decorative laminate, the method of U.S. Pat. No. 4,092,199 issued to Ungar, et al. is preferred and is incorporated herein by reference.

Over the ensuing years since development of the deep textured embossed and registered embossed high pressure decorative laminate technologies noted above, there have been encountered heretofore insurmountable difficulties in producing a suitable deep textured tile design laminate, particularly one with commercially acceptable postforming properties, because of both the unique geometry of the tile profile itself, and the materials used in its manufacture. Most of the "natural material" deep embossed designs, whether registered or non-registered, such as a slate or leather pattern, have a random texture with relatively gradual peak-to-valley texture gradients. Conversely, a tile design, and particularly its grout lines, have steep, nearly perpendicular profiles, which with a desirably deep grout, would make the laminate very difficult to handle during processing and fabrication, and in the worse case, the grout could actually punch through the back of the laminate, resulting in shearing and breakage in the press.

Another difficulty in producing an acceptable tile design heretofore is that traditional ceramic tiles are square, and the consumer's expectation of a tile texture laminate would be that it have square tiles as well. Use of the conventional texturing process of U.S. Pat. No. 3,718,496 issued to Willard, which is widely practiced in the industry, to produce such tile textured laminate, where a real ceramic tile and cementaceous grout artwork master would most likely be used to produce a phenolic resin/kraft paper negative image texturing plate laminate, which in turn could be used to produce the final decorative laminate product, would result in smaller, rectangular tiles. During each step in such a process, i.e., during preparation of the phenolic/kraft texturing plate, during repeated usage of said plate, and during press curing of the final laminate product itself, cumulative asymmetric shrinkage occurs, with shrinkage about twice that in the less paper fiber reinforced crosswise direction of the laminate compared to the more highly reinforced lengthwise direction, due to the paper's directionality. Of particular concern is the progressive shrinkage of the phenolic/kraft texturing plate with repeated usage, resulting in variable, rectangular tile dimensions, which would make butt joining and mitering of laminates pressed from such texturing plates of differing ages impossible without grout line misalignment.

U.S. Pat. No. 3,860,470 issued to Jaisle et al. recognized the propensity for such phenolic/kraft texturing plates to shrink, and taught preshrinking them with exposure to heat in an oven to stabilize them prior to trimming to plate size and use. This was done strictly to reduce shrinkage during subsequent repeated press use, and therefore increase their useful life before being retired as undersized. With random textures such as a slate or leather design, the fact that the texture itself was also shrinking and changing along with the plate's overall dimensions was of little consequence in terms of significantly affecting the design aesthetics, joinery capability, etc., as would be the case with a tile design. While such a method of preshrinking would largely resolve the plate age variability problem, it could not resolve the out-of-squareness issue if starting with real ceramic tile artwork.

Thus, for example, a stable, slightly rectangular tile design stainless steel texturing plate with the requisite negative image of the final laminate tile design, which would compensate for the shrinkage of the final laminate product, would be effective in preventing the above-described problems. However, producing such plates, with a raised grout pattern and tile face texture design as well, by mechanical machining, chemical etching or some other method, would be extremely difficult and expensive to accomplish, particularly in any large quantity required to satisfy the capacity of a conventional multi-opening laminating press.

Thus, there is a need for a deep embossed tiled design high pressure decorative laminate that has the characteristics that have not heretofore been achieved. There is also a need for a method of producing such a deep embossed tiled design high pressure decorative laminate. Other needs will become apparent upon a reading of the following detailed description, taken in conjunction with the drawings.

SUMMARY OF THE INVENTION

The aforementioned needs are fulfilled by a deep embossed high pressure decorative laminate having a plurality of integral tiles with various surface textures bordered by deep embossed portions. Each tile of the laminate has a peripheral thickness greater than the thickness of the non-peripheral portions of the tile. Preferably, each tile has a concave profile along its upper surface when viewed in cross section. A method of producing artwork necessary for the deep embossed high pressure decorative laminate of the present invention comprises assembling a first layer of fibrous sheets impregnated with a thermosetting resin, a second layer comprising a plurality of adjacent tiles comprising a plurality of fibrous sheets impregnated with a thermosetting resin, wherein the tiles were previously pressed and heated, and a third layer comprising a plurality of shims. The assembly is then pressed and heated against a rigid substrate whereby the second layer forms a substantially convex shape on the upper surface of each tile, thus imparting substantially concave impressions on the first layer. The first layer is subsequently removed from the second and third layers, and grooves are formed in the first layer, preferably by machining.

DETAILED DESCRIPTION OF THE INVENTION

Figure 1:
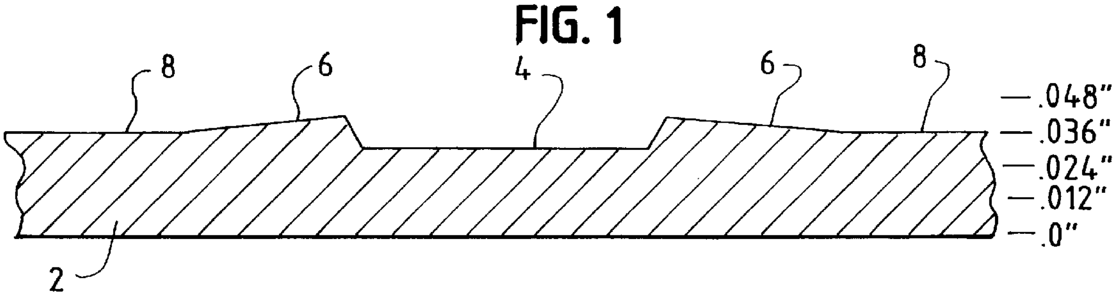
FIG. 1 is a partial cross-sectional elevational view of a deep embossed postformable high pressure decorative laminate according to the present invention.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated.

As discussed above, there are many deficiencies with the prior art, that heretofore precluded manufacture of a commercially acceptable postforming, high pressure decorative laminate with a deep, well defined grout line and square tile design, and with consistent three-dimensional texture dimensions, i.e., the tile size, grout width and grout depth. The starting artwork used to prepare a suitable textured phenolic/kraft press plate according to the method of U.S. Pat. No. 3,718,496 Willard, previously incorporated herein by reference, can not be made from commercially available square ceramic tiles, for the reasons previously delineated.

It was found, however, that phenolic/kraft paper laminates shrink predictably with repeated or continual exposure to heat: the rate of shrinkage being a function of the temperature and thickness of the laminate, and the final degree of shrinkage being a function of the resin content of the phenolic resin treated kraft paper "filler" used in its construction, and the temperature. Shrinkage is initially the result of removal of residual moisture contained within the laminate, and then continuation of the crosslinking, condensation polymerization reaction cure of the laminate, where pendant hydrophilic methylol groups on the phenolic nuclei crosslink to form hydrophobic ether and methylene bridges, and as the cure is advanced further, residual ether linkages are converted to the shorter bond length methylene bridges. This process pulls the three dimensional, polymeric phenolic lattice together, resulting in shrinkage of the entire laminate mass. The curing chemistry for phenolic resins is well understood by those versed in the art.

With temperature and resin content of the filler held constant (as well as the phenolic resin formulation and grade of kraft paper used), the times required to preshrink various thickness press cured phenolic resin/kraft paper laminates was established, and found to be predictable and repeatable. As long as the subsequent press cure temperature for final decorative laminate manufacture does not exceed that of the conditioning temperature of the preshrunk phenolic/kraft textured laminate plate used to produce it, the latter will be stable and no further significant shrinkage will occur. As such, the phenolic/kraft texturing plate should be preshrunk at a higher temperature than the press cycle top cure temperature used for the manufacture of the final decorative laminate product. The phenolic/kraft laminate shrinks asymmetrically, with the cross direction (width) shrinking about twice that of the length direction on a percentage basis, since in the cross direction, the shrinkage is not restrained as much by the directionality of the paper fibers, i.e., the laminate has a lower compressive strength in the cross direction than in the length direction. The length direction fully shrinks about 0.4–0.6%, whereas the cross direction shrinks about 0.7–0.9%, depending on the above mentioned variables. Hence, rectangular tiles will be produced after repeated pressings if starting with a square tile artwork.

Therefore, the key to obtaining square tiles of the desired dimensions in the final laminate product, is to begin the process with stable rectangular tiles in the starting artwork, where said tiles are properly sized, being slightly wider than they are long. How oversized the tiles in the beginning artwork should be is dependent on the established length and width shrinkage coefficients, as well as the number of pressing steps, or replications, required between the artwork (or its precursor "pre-artwork", which will be described below) and the final decorative laminate pressing, which also shrinks about 0.10% in the length direction and 0.15% in the cross direction out-of-press, relative to the dimensions of the texturing plate it was pressed against, as tensile stresses relax.

It is preferred to use the method of U.S. Pat. No. 3,718,496 issued to Willard for the preparation of the texturing plate, wherein the texturing plate used to produce the final decorative laminate is obtained directly from an original artwork. More complicated replication processes have evolved, designed to preserve, protect and extend the life of the original artwork, for example, where a phenolic/kraft negative image "supermaster" is prepared from the artwork, which is then used to produce a phenolic/kraft positive image "copymaster", which in turn is used to generate a phenolic/kraft negative image texturing plate, which is then finally used to manufacture the decorative laminate.

While such a process does better protect the artwork, there would be more shrinkage steps involved, and more importantly, with each replication step, about 10% of the overall texture depth and fidelity is lost. While this may be acceptable for a slate or leather texture, it is not preferred in the practice of the present invention, where sharp, well defined grout lines are desired, and texture loss is even greater in those areas. The only requisite with use of the simpler Willard process is that the artwork not be too delicate or irreplaceable, i.e., that duplicate artworks can be produced relatively easily and inexpensively, which this invention also embodies. As will be described in more detail below, by preshrinking the phenolic/kraft laminate used for the pre-artwork, artwork and texturing plate, and compensating for the decorative laminate shrinkage as well, the exact rectangular dimensions for the tiles in the starting pre-artwork can be determined, such that the tiles in the final decorative laminate will have the desired dimensions, as will the width of the grout lines.

A typical postforming laminate, used for kitchen countertops and the like applications, has a thickness of about 0.036 inch (NEMA grade HGP), and is expected to postform to a ⅝ inch surface outside radius of curvature or better. In reality, a typical postformed countertop profile includes a ¾ inch surface outside radius bull nose bend, a 3/16 inch surface inside radius cove bend, and a ¾ inch surface outside radius backsplash bend, which must be met consistently, without cracking or blistering, if the postformable high pressure decorative laminate of the present invention is to be commercially viable. With a desired grout line depth of about 0.012 inch, the resultant laminate would only have a sanded thickness of about 0.024 inch in the grout line areas, which is too thin for everyday handling of the laminate during manufacture and fabrication, without experiencing excessive breakage at the grout lines. With this grout line depth, punch-through of the grout lines and fracture of the laminate during pressing can also occur.

To resolve this dilemma, rather than using conventional flat tiles, the tiles of the present invention were designed with their periphery or edges (adjacent to the grout lines) raised about half the desired depth of the grout line above the plane of the tile face itself, i.e., tiles with a quasi-concave or dished profile. To accomplish this profiling, a negative image phenolic resin/kraft paper "pre-artwork" was used to prepare the artwork laminate, as will be described in detail below. In such a manner, the resultant laminate will actually have the desired grout line depth of about 0.012 inch, but the grout line will only penetrate into the laminate below the elevation of the tile face about 0.006 inch. This novel method and structure therefore allows for the manufacture of a 0.036 inch thick postforming laminate with a thickness of about 0.030 inch at the grout line areas, rather than only about 0.024 inch thick in those areas and being much more fragile, as would otherwise be the case using conventional flat tiles.

This concept is illustrated in FIG. 1, which shows a cross-sectional elevation view, roughly to scale, of the tile design, high pressure decorative laminate of the present invention 2, in the area of a grout line 4, where the tile edges 6, adjacent to the grout line 4, are dished upwards relative to the essentially planar faces of the rest of the tile bodies 8, whether the tile faces have a smooth or rough texture therein. Although tiles having dished edges or concave shapes are discussed herein, those skilled in the art will recognize that a multitude of other tile shapes may be used to perform the present invention, such as stepped shapes or other graduated shapes.

Figure 2:
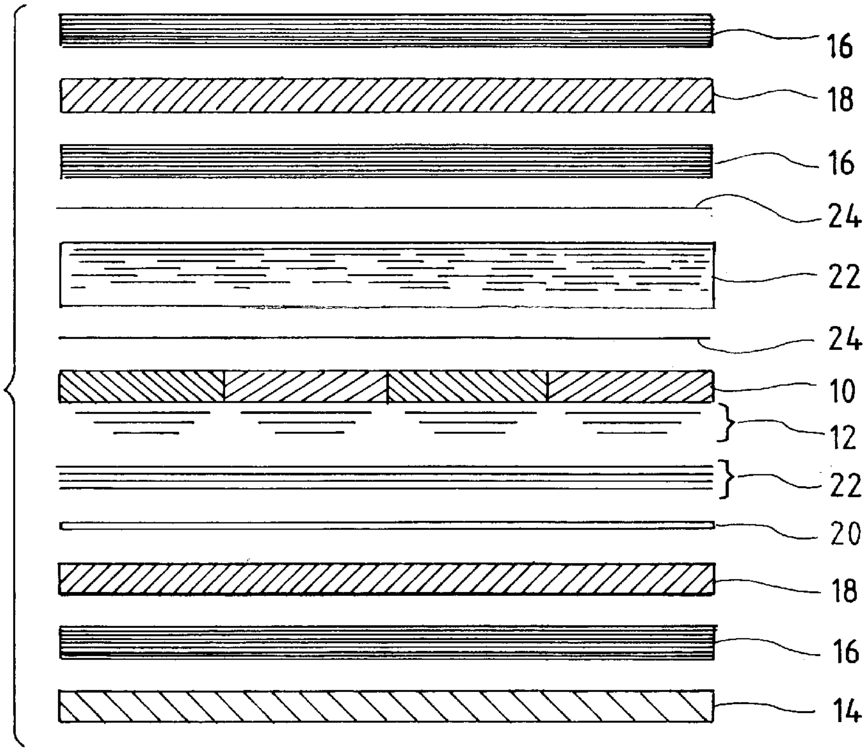
FIG. 2 is a cross-sectional exploded view of an assembly used to prepare artwork of the present invention.

Referring to FIG. 2, the pre-artwork tiles 10 were prepared by first pressing 32 plies of phenolic resin treated 115 pounds per ream kraft paper filler against a rigid, heat stable material with the desired positive image surface texture, whether a smooth plate or some other relatively subtle texture, with a polypropylene release film in-between, resulting in a nominal ¼" thick phenolic/kraft laminate with the negative image of the tile texture of choice imparted to it. This pre-artwork stock was sanded on the back side, then baked in an oven for 4 days at 135 C. to preshrink the material. The pre-artwork laminate was then accurately cut into individual rectangular tiles 10 of predetermined dimensions, based on the lengthwise and crosswise shrinkage coefficients of the subsequent artwork, texturing plate and final decorative laminate article. To the backside of each individual tile 10 was then "spot welded", with isocyanurate glue, nominally square shims 12 of decreasing dimensions to form a step-wedge effect, said shims 12 being comprised of phenolic/kraft filler. On top of a press carrier tray 14 were placed in ascending superimposed relationship several plies of untreated kraft paper "cushion" 16, a nominal 0.100" thick steel plate 18, an epoxy film adhesive sheet 20, and four plies of 115 lb. basis weight phenolic/kraft filler 22. The preferred adhesive sheet is CyTec Fiberite Inc.'s FM 300-2M epoxy film, with a tensile shear strength of approximately 3200 psi at 250 F. (120 C.) and 2000 psi at 300 F. (150 C.), and with a continuous service temperature rating of 275 F. (135 C.).

The tiles 10, with the shims 12 attached and facing the filler 22, were then butt joined by gluing them to the topmost ply of filler 22 by means of an epoxy resin (Gougeon Brothers, Inc's West System 105) applied to the backside perimeter of each tile. The tiles 10 were weighted and allowed to sit 12 hours while the epoxy cured. The pack build-up was then completed by placing, in ascending superimposed relationship on top of the tiles 10, a sheet of 1 mil (0.001" thick) high softening point biaxially oriented polypropylene film (BOPP) 24, 32 more plies of the 115 lb. basis weight phenolic/kraft filler 22, which during pressing will mold into a nominal ¼" thick positive image artwork sheet 26 (FIG. 2B), another sheet of 1 mil BOPP 24, 16 additional plies of kraft cushion 16, another steel plate 18, and finally several more plies of kraft cushion 16 on the top of the pack. It should be understood that, as previously discussed, the filler may be formed of other materials, such as linerboard, fabric, glass, or carbon fiber. The BOPP, commercially available from many suppliers, was used as a two-sided separator sheet for the phenolic resin based laminate surfaces, as will be appreciated by those versed in the art.

Figure 2A:
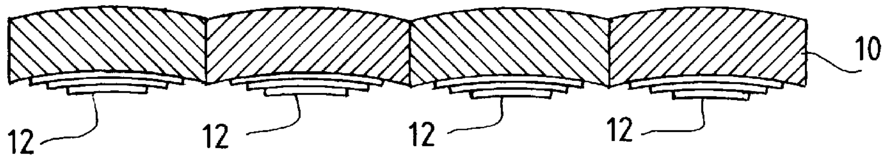
FIG. 2A is a cross-sectional view of a layer of FIG. 2 after it has been pressed and heated in the assembly of FIG. 2.
Figure 2B:
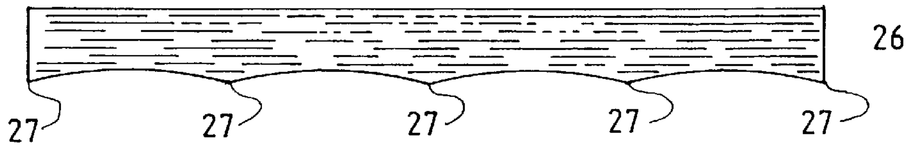
FIG. 2B is a cross-sectional view of another layer of FIG. 2 after it has been pressed and heated in the assembly of FIG. 2.

After loading into a high pressure flat bed hydraulic press, the pack was heated to about 150° C., held at that temperature for 1 hour to insure full cure of the epoxy film, and then cooled to near room temperature, all under a specific pressure of 1400 psig. At that pressure, the edges of the individually shimmed pre-artwork tiles 10 deflected downward to form a substantially convex shape on the top surface thereof, as shown in FIG. 2A, and the artwork 26 on top of the individually shimmed pre-artwork tiles 10 was molded and cured to a reverse of that shape, i.e., a concave shape, as shown in FIG. 2B. Upon cooling and removal from the press, the artwork 26 was separated from the bonded pre-artwork 10, 12, 22, 20, and 18, and consisted of a unified, ¼" thick phenolic/kraft laminate with the positive image of the final tile face texture, with raised crisscross pattern ridge lines 27 corresponding to where the grout lines would be located, and sunken "square" areas corresponding to the resultant tile locations. The newly formed artwork 26 was then baked in an oven for 4 days at 135° C. to effect full shrinkage.

The next step in preparing the artwork 26 was to machine in, along the tile ridge lines 27, the desired grout design using a router. The type of router bit and guide employed will determine the general shape, width and depth of the grout lines and tile edge profile, with position, alignment and "squareness" of the grout lines critical to obtaining the desired final decorative laminate design. Many grout line/tile edge design options are possible, including square, rounded or beveled tile edges; straight, "craggy" or chipped tile sides; square or rounded tile corners; and with a flat or rounded grout bottom. For a craggy tile edge look, a randomly uneven router guide "wobble board" was used, and fine detail tile edge work for edge chipping, corner rounding, etc. was accomplished with a Dremel MultiPro rotary tool and appropriate bit. Optionally, the grout depth can be over-routed too deep, and subsequently back-filled with a suitable grouting compound that will be capable of withstanding the laminating press temperatures it will be exposed to.

The grouting compound can be course or smooth, depending on the final design sought. Grouting compounds that have been used include China clay filled epoxy resin, PVA, a PVA/fine sand/cement mixture, furnace cement and Omega Engineering's CC [ceramic cement] High Temperature Cement. Each material has its own distinct shrinkage characteristics during its initial cure and final press cure, as well as its own unique compressibility characteristics under pressure in the press. These properties must be predetermined to establish how much to fill the grout channel in the artwork. It is important to establish the proper grout depth in the cured artwork if the desired grout depth is to be achieved in the final decorative laminate, since the grout depth will decrease about 25% with each replication step in the process. The reason for the loss of the grout depth/height reproducibility is primarily due to the need to use a separator film between the two articles, with secondary effectors being that the "parent" expands slightly in the z-direction (thickness) during pressing, and the "child" contracts slightly in the z-direction upon cooling in the press, and during the preshrink baking operation thereafter.

One particularly useful grouting compound was developed, consisting of a mixture of the West System 105 epoxy resin, Dualite hollow composite microsphere filler (Pierce & Stevens Corp.), and SEPR's Zirblast Grade B60 ceramic shot (0.1250–0.250 mm diameter). This material exhibits very predictable, one time, irreversible compaction or compression, with collapse of the microspheres during the initial pressing, and the degree of compression can be varied with the ratio of the components. A mixture by volume of 1 part epoxy resin, 3 parts microspheres, and 2 parts ceramic shot will compress about 50% during the initial pressing, and will not change substantially thereafter. Based on the above, to obtain a final decorative laminate grout depth of about 0.012 inch, the artwork grout channel was routed to a depth of 0.042 inch, the grout channel was then filled with the above proportioned grouting compound mixture to the top edge of the tiles, and the grout was allowed to cure 12 hours at room temperature prior to pressing. During pressing to produce the negative image texturing plate, the grout will collapse to a depth of about 0.021 inch, and impart a grout height of about 0.016 inch to the texturing plate. This plate, in turn, will produce an embossed decorative laminate with a grout depth of about 0.012 inch.

To variation of the above artwork preparation process was developed to further improve the dimensional stability of the entire artwork plate. Rather than machining the grout lines into the full size preshrunk artwork sheet 26, the preshrunk artwork sheet 26 was first cut into individual tiles of predetermined dimensions. This process requires that the pre-artwork, and the individual tiles 10 thereon forming the pre-artwork, be larger than for the "full sheet artwork" method discussed above, to allow and compensate for the saw kerfs when cutting the tiles. Optionally, the pre-dished tiles can then either be butt joined and bonded to a steel plate prior to machining the grout and tile edges, and filling the grout, as above, or the tiles can first be individually machined, with grout cut-outs, etc., prior to butt joining and bonding to a steel plate or other suitable base. In this manner, if there should be any dimensional movement of the tiles due to slight continued shrinkage of the tiles even after preshrinking, each tile will move individually and the grout centerline design will be preserved.

It will be appreciated by those versed in the art that other pre-dished tiles can be used in the practice of this invention; for example, machined or drop forged metal tiles, molded high temperature plastic tiles, or cast ceramic tiles, whose edge and grout treatments can optionally be machined prior to adhering them to a steel sheet or other suitable substrate.

Figure 3:
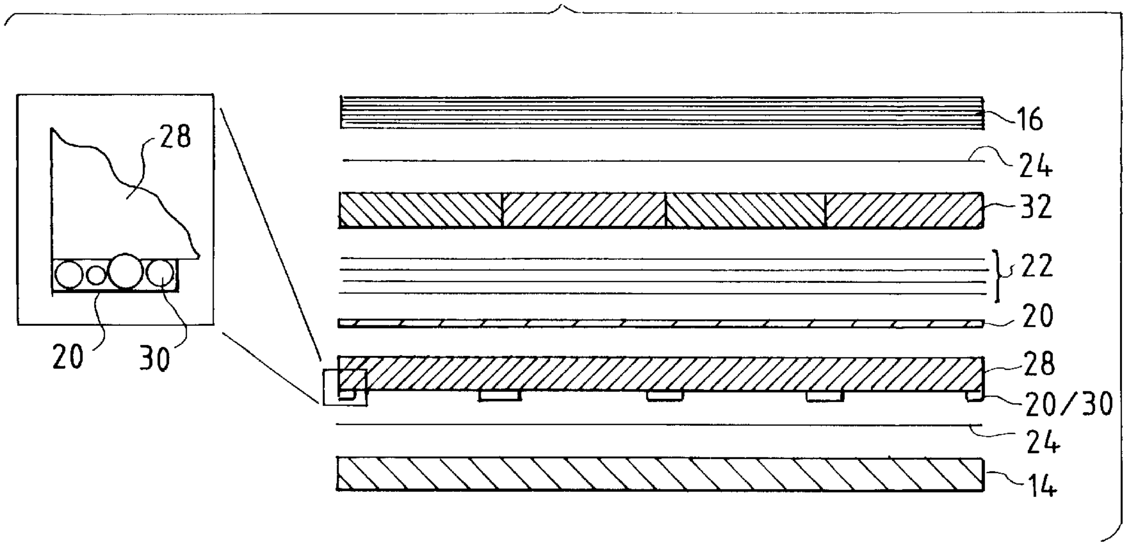
FIG. 3 is a cross-sectional exploded view of another assembly used to prepare artwork of the present invention.

A second method of creating dished tiles in the positive image artwork, without the need of first creating a pre-artwork, was also developed. Referring to FIG. 3, a criss-cross lattice work grid, comprised of strips of the Cytec Fiberite FM 300-2M epoxy adhesive film 20, was laid down on the back side of a nominal 0.100 inch (12 gauge) cold rolled mild carbon steel plate 28 conforming to ASTM A366 specifications. The centerlines of the grid strips corresponded exactly to the edges of butt joined preshrunk tiles 32 of predetermined, slightly rectangular dimensions. The epoxy adhesive strips 20 were then heated momentarily with a heat gun until soft and tacky, and Zirblast B60 ceramic shot 30 was spread over the lattice work strips and gently patted into them. After removing the excess shot with a vacuum cleaner, there results a near-continuous "film" of ceramic shot 30 stuck in the adhesive film strips 20. The plate, with the lattice work adhered to it on its upper side, was then placed in a flat bed laminating press and baked for 1 hour at about 150 C., with the press only partially closed, to set and cure the epoxy/ceramic shot strips 20, 30. Afterwards, in superimposed ascending order on a press carrier tray 14 were placed first a ply of BOPP separator/release film 24, and then the mild steel plate 28 with the adhesive/ceramic shot strips 20, 30 face down against the BOPP film 24 and the carrier tray 14. On top of the steel plate 28 was then placed in superimposed ascending relationship first a continuous film of the CyTec Fiberite FM 300-2M epoxy adhesive 20, and then 4 plies of phenolic resin/kraft paper filler 22.

In a separate operation using essentially the method of U.S. Pat. No. 3,718,496 Willard referenced herein, 16 plies of phenolic resin treated 115 pounds per ream kraft filler were pressed against a rigid, heat stable material with the desired positive image surface texture, resulting in a nominal ⅛ inch thick phenolic/kraft laminate with the negative image of the texture of choice imparted to it. After trimming off the excess filler "flash", this texturing plate was then used in the same manner to produce another ⅛ inch thick phenolic/kraft laminate with the positive image of the chosen texture imparted to it. This second replication laminate, with the positive texture image, was then baked in an oven at 135° C. for 3 days to preshrink it. After shrinking, the sheet was cut into tiles 32 of predetermined dimensions.

Figure 3A:
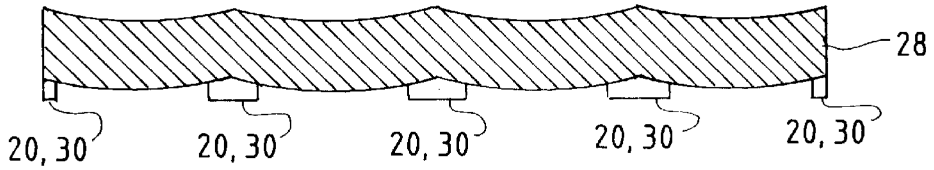
FIG. 3A is a cross-sectional view of a layer of FIG. 3 after it has been pressed and heated in the assembly of FIG. 3.
Figure 3B:
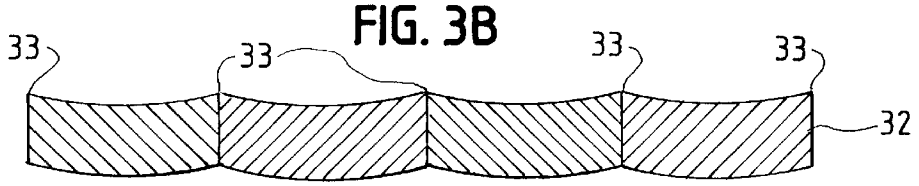
FIG. 3B is a cross-sectional view of another layer of FIG. 3 after it has been pressed and heated in the assembly of FIG. 3.

Still referring to FIG. 3, the preshrunk tiles 32 were placed on top of and glued to the filler 22 with West System 105 epoxy resin applied to the bottom side perimeter of each tile, being butt joined such that the joints were exactly centered over the center lines of the epoxy adhesive/ceramic shot shim strips 20, 30 underneath the filler 22, adhesive film 20, and mild steel plate 28. The tiles were weighted and allowed to sit 12 hours for the epoxy resin to cure. Then, in ascending superimposed relationship were placed on top of the tiles a sheet of BOPP film 24, and finally 16 plies of cushion 16. After this assembly was loaded into a flat bed, high pressure laminating press and pressurized to 1400 psig specific pressure, the pack was heated to about 150° C., held at that temperature for one hour to achieve full cure of the epoxy film and bond to the steel plate, and then cooled to near room temperature. At this press pressure, the mild carbon steel plate 28 was deflected on the top surface in a concave manner as shown in FIG. 3A, with permanent deformation around the incompressible ceramic shot 30 supported lattice work shims 20, 30, thereby causing the bonded tiles 32 to also deflect and form a generally concave shape on the upper surface thereof, with raised areas 33 at the butt joints where the grout lines would be machined, as shown in FIG. 3B. With use of the B60 ceramic shot, the amount of dishing was about 0.008 inch, which was more than adequate to allow for a 0.012 inch grout depth in the final decorative laminate. The amount of dishing can be easily controlled by the grade (diameter) of the ceramic shot used, the thickness of the lattice work shims, which can be built up systematically with more than one layer of adhesive film strips and ceramic shot application, and by the thickness of the tiles themselves, where thinner tiles are more easily deflected than are thicker ones.

After the novel artwork is prepared by any of the methods of this invention described above, a flat backed, negative image, single-sided texturing plate can next be prepared, essentially in accordance with the methods of U.S. Pat. No. 3,718,496 issued to Willard and U.S. Pat. No. 3,860,470 issued to Jaisle et al. previously referenced. Specifically, in ascending superimposed relationship on a press carrier tray were placed 8 plies of 115 pound basis weight kraft cushion, the tile artwork, texture side facing up, 1 sheet of BOPP separator/release film, 8 sheets of 115 pound per ream phenolic resin treated kraft filler, another sheet of BOPP film, a smooth steel backing plate, and finally 8 more plies of cushion on top of the pack build-up.

This assembly was loaded into a flat bed hydraulic laminating press. After closing and pressurizing the press to 1400 psig specific pressure, the pack was heated to about 135 C. in about 20 minutes, held at that temperature for about another 20 minutes, and then cooled to near room temperature. The pack was then removed from the press, and the newly formed phenolic/kraft texturing plate, approximately 1/16 inch thick, separated from the artwork. The texturing plate was then baked in an oven for 3 days at 135 C. to preshrink it. It will be appreciated by those versed in the art that the thickness of the phenolic/kraft texturing plate can be varied simply by altering the basis weight of the filler or the number of filler plies used in the build-up, but a nominal 1/16 inch plate is preferred for its intended application within the scope of the present invention. Thinner plates will be more fragile and easily damaged, and thicker plates will adversely affect heat transfer, press cycle time, press pack capacity and productivity.

After preshrinking, the texturing plate was very brittle and could be easily broken, and as such, was unsuitable for manufacturing use as is. This deficiency can be corrected to some extent by producing a substantially thicker texturing plate, bonding two plates back-to-back with a suitable adhesive, thus producing a double sided texturing plate, or bonding it to a flat sanded phenolic/kraft laminate sheet (also preshrunk) to produce a thicker one sided texturing plate while avoiding the longer preshrinking time required when producing a thicker texturing plate directly in the press, albeit with the penalties previously noted. However, the preferred method to improve the durability of the working texturing plate and its heat transfer properties is to bond the nominal 1/16 inch phenolic/kraft texturing plate to a sheet of cold rolled carbon steel using a suitable, temperature resistant adhesive.

Specifically, in ascending superimposed relationship were placed on a press carrier tray 16 plies of 115 pounds per ream kraft cushion, 1 sheet of BOPP film, the preshrunk 1/16 inch phenolic/kraft texturing plate face down with the textured side towards the cushion, a continuous CyTec Fiberite FM 300-2M epoxy adhesive film, a sheet of 12 gauge cold rolled carbon steel suitably prepared by sanding and degreasing of its bonding face, another ply of BOPP film, and finally 6 plies of kraft cushion on top of the pack. This assembly was loaded into a flat bed hydraulic laminating press, pressurized to 1000 psig specific pressure, heated to about 150 C. and held at that temperature for 1 hour to fully cure the adhesive sheet and insure good bonding of the phenolic/kraft texturing plate to the steel, and then cooling the pack to near room temperature.

The tile texturing plate composite, or template, thus obtained after the edges were trimmed of excess phenolic/kraft flash, was essentially flat. Optionally, the steel core template can be simultaneously balanced with another preshrunk phenolic/kraft texturing plate, or a preshrunk flat phenolic sheet, on the other side, but it is not necessary to do so since the coefficients of thermal expansion of the two materials are quite similar. It will be understood by those versed in the art that other core materials, such as a stainless steel or suitable aluminum alloy, e.g. AISI 410 and 6061 T6 respectively, can be used effectively, but use of mild carbon steel is preferred due to its substantially lower cost and ready availability, as well as its compatible thermal expansion characteristics.

The durable steel backed, tile design texturing template described above is suitable for the manufacture of a postformable, deep grout textured, registered embossed, tile design, high pressure decorative laminate by conventional laminating techniques as will be described in detail in the following example. It should be appreciated that the scope of this instant invention is not limited in any way by the description of the preferred embodiments set forth above. The following specific examples are provided to illustrate further aspects and unique advantages of the present invention, and other features and embodiments should become apparent to those skilled in the art. The example is set forth for illustration only, and should not be construed as limitations on the scope of the present invention.

Example—Part A

It was considered aesthetically desirable to produce a two-color, gray-on-white, registered embossed, high pressure decorative laminate with a 4 inch square "tumbled" tile design, and with uneven 3/16" wide "craggy" grout lines 12 mils (0.012") deep, wherein the 4 inch tile repeat would include both the tile face and half of each adjacent grout line. A 65"×150" (oversize 5'×12') artwork plate was produced in accordance with the first method (second option) of this invention, described above, utilizing a pre-artwork plate to dish the artwork tiles, with one minor process modification.

The material chosen to provide the tile texture was a Homopal GmbH metal clad decorative laminate with a relatively small, random, bumpy texture, the inverse or negative of which was judged would be suitable for providing small craters for the tile's uneven, tumbled look. Therefore, a phenolic/kraft laminate for the pre-artwork could not be pressed directly from the Homopal laminate, since it would have the inverse symmetry needed, i.e., in this case, the Homopal laminate was considered to possess the tile's negative design, such that a laminate pressed directly off it would have the tile's positive design. However, the pre-artwork must have the tile negative design, such that the artwork produced from it has the tile positive design. Therefore, the phenolic/kraft laminate pressed directly off the Homopal laminate was trimmed to remove edge flash, and then used as a texturing plate to press an additional 1/4 inch thick phenolic/kraft laminate having the same texture as the original Homopal laminate, i.e., the tile's negative texture. This 1/4 inch thick phenolic/kraft laminate with the tile's negative texture image was then baked in an oven at 135 C. for 4 days to preshrink the material.

After the preshrinking process was completed, and the material allowed to cool to room temperature, it was carefully cut into rectangular tiles with predetermined dimensions of 4.269 inches in the width (cross) direction and 4.246 inches in the length direction, using a caliper to insure the accuracy of the tile dimensions. The dimensions were determined using length and width shrinkage coefficients for the positive image artwork and negative image texturing plate of 0.55% and 0.80% respectively, and for the final decorative laminate of 0.10% and 0.15% respectively, a saw kerf width for each tile of 5 mm (0.1969"), and with a square tile dimension for the finished decorative laminate of 3.8125 inches for the tile face plus 0.1875 inch for the grout, or 4.0000 inches total. The calculation for the cross direction dimension was therefore 4.0/(0.992)(0.992)(0.9985)+0.1969/0.992=4.269 inches, and for the length direction 4.0/(0.9945)(0.9945)(0.999)+0.1969/0.9945=4.246 inches. The second term is not required if the "full sheet artwork" method is to be used, and additional shrinkage factors would be required in the first term denominator if more replication steps than the preferred method are planned in the process.

After the pre-artwork tiles were cut to size, they were shimmed on the backside with 3¼", 2¾" and 2¼" squares of phenolic resin treated 115 pound per ream kraft filler, in superimposed relationship centered on the individual tiles. The pre-artwork and artwork plates were then prepared by the prescribed method of this invention detailed above, with a grout centerline tile layout. After preshrinking the ¼" thick phenolic/kraft positive artwork sheet obtained in an oven for 4 days at 135 C., it too was accurately cut into individual tiles along the grout area ridge witness lines on a table saw with a 5 mm kerf blade. After gluing them in place by the prescribed method of this invention detailed above, 3⁄16" wide grout channels were routed with a straight flute bit to a depth of 0.042". The edges of the grout channels were then machined with a different router bit, using a wobble board guide to create a randomly uneven, wavy effect, and afterwards, the top edges were randomly chipped with a Dremel tool. The grout lines were then filled with the "50% collapsible" epoxy resin, microspheres and ceramic shot grouting compound previously discussed.

From this prepared artwork, by the methods prescribed above, a nominal 1⁄16" thick, negative image phenolic/kraft texturing plate was produced, which after preshrinking for 3 days at 135 C., was adhered to a 62¼"×147" sheet of 12 gauge cold rolled carbon steel. Several additional, identical cold rolled carbon steel backed texturing templates were then prepared from the original artwork in a like manner.

Example—Part B

A light weight, 14 pound per 3000 square foot ream, clear overlay paper was treated to 71–73% resin content (the difference between the treated weight and the untreated weight, divided by the treated weight) and 8–9% volatile content (the difference between the treated weight and bone dry treated weight, divided by the treated weight) with a high flow, pigmented melamine-formaldehyde resin; said resin being plasticized and suitable for postforming applications. The resin blend was comprised of (by weight) 81% of the melamine base resin (50% solids content), 10% 2-phenoxyethanol flow promoter, 7% gray ink, and 2% alumina grit (50:50 5 and 15 micron diameter particle sizes) to enhance abrasion resistance, wherein the ink formulation consisted of 0.035% black ink and 99.965% white (titanium dioxide based) ink, both with aqueous solvated, melamine resin compatible vehicles.

Additionally, a 75 pound per ream, white pigmented solid color decorative paper was treated with the same unpigmented and otherwise unmodified melamine-formaldehyde base resin to 48%–50% resin content and 7–9% volatile content.

Furthermore, 115 pound per ream saturating kraft paper was treated with a postforming type phenol-formaldehyde resin to a resin content of 26–28% and a volatile content of 8–10%.

In addition, the same phenolic resin used to treat the kraft filler, was also used to treat 115 pound per ream bleached kraft "barrier" paper to 27–29% resin content and 7–9% volatile content. This paper forms an optical barrier between the light color decorative paper and the dark phenolic/kraft filler, so as to prevent show-through of the laminate's dark core to its optical surface.

Finally, 75 pound per ream stresskraft (Tolko Paper Company, Canada) was treated to a 27–29% resin content and 7–9% volatile content with the same phenolic resin as used for the above kraft filler. The stresskraft is an extensible paper used as the backmost plies to enhance formability, and particularly cove forming, where the back of the laminate is in tension and requires some extensibility during the forming operation.

Formulations for suitable postforming melamine and phenolic resins are well known by those versed in the art, as are the treating methods used for the various types of papers, and the roles of each of the various treated materials contained in the decorative laminate's construction. As such, further details will not be delineated herein.

Example—Part C

Deep grout, registered embossed, tumbled tile design, postformable grade high pressure decorative laminates, with the prerequisite perfectly square tile configuration, were produced using the tile texturing templates from Part A, and treated materials from Part B, of this example. The tumbled tile laminates themselves had a construction consisting of, in descending superimposed relationship, 2 plies of stresskraft, 2 plies of the standard kraft filler, 1 ply of barrier, 1 ply of the white solid color decorative paper (felt side facing down), and 1 ply of the pigmented overlay.

The actual press pack assembly was comprised of, in ascending superimposed relationship on top of a press carrier tray, 1 sheet of untreated kraft "cushion", 1 flat, hard AISI 410 stainless steel "backing plate" (with a Rockwell C hardness of about 40–42), 2 plies of cushion, one of the tile templates textured side facing up, 2 sheets of LC-59 texturing/release paper (Ivex, Inc.), with the coated side of one sheet facing the texturing template and the coated side of the other sheet facing up, one of the tile laminate assemblies described above, with the pigmented overlay against the coated side of the second, uppermost sheet of LC-59, 2 plies of a wax separator paper (with their coated release sides facing away from each other), 3 sheets of kraft cushion, and 2 more sheets of wax separator paper.

This sequence of tile texturing template (face up), tile decorative laminate assembly (face down), and cushion, with the appropriate sheets of LC-59 release/texturing papers and wax separator papers interleaved as described above, was repeated four additional times. The pack construction was then completed with another stainless steel backing plate, and finally, 3 kraft cushion on the top of the pack. As such, the completed press pack consisted of five tile texturing templates with their design facing up, and five laminate assemblies with their decorative surfaces pressed against them and separated from the templates by means of texturing/release sheets, which also serve to impart a subtle secondary texture to, and control the final gloss level of, the surface of the laminates so produced. The function of the interleaved cushion was to prevent "shadowing" of the deep grout texture from one template/laminate pair to the adjacent laminates, where the high flow, pigmented melamine resin in the overlay is sensitive to pressure differentials induced by the texturing template's grout lines. Optionally, rather than use of internal cushion for this purpose, several plies of phenolic/kraft filler can be used in its place to simultaneously produce backers, for example NEMA grades BKV or BKL.

As will be appreciated by those versed in the art, other suitable decorative postforming laminate constructions, and pack build-ups, can alternatively be used that would not circumvent the spirit and scope of the present invention. Additional optimization is still required to improve the pack build-up productivity, i.e., increase the number of sheets per pack of tile laminate that can be produced, for example by reducing the amount of cushioning, or possibly with use of double-sided rather than single-sided tile texturing templates, or other like process improvements. It should also be appreciated that the color combinations of pigmented overlay and decorative underlayment sheet are essentially limitless, and that the underlay is not restricted to a solid color decorative sheet, in that a print sheet can also be employed with pleasing results. Furthermore, other methods of registered embossing, and non-registered embossing, are also suitable in the practice of the present invention.

After inserting the above described pack into a nominal 5'×12' flat bed, multi-opening, high pressure hydraulic laminating press, the press was closed and pressurized to 1400 psig specific pressure. The pack, along with other packs of conventional postforming laminate to fill the press, was heated to 132 C. in about 20 minutes, held at that temperature for another 20 minutes, and then cooled to near room temperature. After discharge from the press, and separation of the registered embossed tile design decorative laminates from the tile texturing plates, the laminates were then trimmed to about 61¼"×145½" and back sanded on conventional equipment. The decorative laminate sheets were then split lengthwise, along the center grout line, to about 30½"×145½" size using an SCMI traveling undercut saw. The pressing procedure was repeated several more times to obtain enough nominal 2½'×12' splits to conduct a reasonably thorough postforming trial. The laminates obtained were all about 0.036 inch thick after sanding, with about a 0.011–0.013 inch average grout line depth.

Example—Part D

A kitchen countertop postforming trial was conducted using a Midwest Automation/Bechtold Engineering Roll-A-Matic postforming machine, with in-line parabolic infrared radiant heaters, for the simultaneous forming of the outside radii bull nose and backsplash bends, with the particleboard blanks radiused to ¾" with a router for both, and a Midwest Automation cove forming machine with an electrically heated 3/16" radius cove bar. Those versed in the art should be familiar with typical postforming equipment, such as the above, and their operations.

Thirty-six twelve foot long countertops were postformed without encountering any crack failure for either the outside bends or at the cove. Blister resistance was also acceptable, as was surface cure, previously measured by the widely used "tea pot" test (NEMA Test Method LD 3–3.5 Boiling Water Resistance), with no adverse effects noted. The registered embossed, deep grout tile textured laminates of this invention, and the kitchen countertops thus prepared and surfaced therewith, were extremely pleasing in terms of the tile face tumbled appearance, the color variation with the registered embossing, and the pronounced grout lines, with the distinctive relief and feel thereof.

A 90 degree mitering trial with the above postformed, tile design kitchen countertops was also conducted at the postformers shop. When the 45 degree cuts were made arbitrarily, the grout lines for the two halves did not match up properly, which detracted from the overall "real" tile effect. However, when the 45 degree cuts were made diagonally through the grout line intersections, with the aid of a laser guide, the grout lines matched very well, and the real tile look was preserved.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

We claim:

1. An embossed laminate comprising:

a plurality of integrally joined tiles, wherein each of said tiles is bordered by embossed portions, and each of said tiles has a peripheral portion with a thickness greater than a thickness of a non peripheral portion of said tile, wherein said tiles have a substantially concave cross section with respect to the top surface of the tiles, and wherein there is a gradually decreasing gradation in thickness between said peripheral portion and said non-peripheral portion and said thickness of said peripheral portion is greater than said thickness of said non-peripheral portion by an amount that is substantially one-half the depth of said embossed portions.

2. The embossed laminate of claim 1, wherein the embossed portions are embossed to a depth of 0.012 inches.

3. The embossed laminate of claim 2, wherein the embossed portions correspond to grout lines.

4. The embossed laminate of claim 1, wherein the tiles are textured on an upper surface thereof.

5. The embossed laminate of claim 1, wherein said embossed laminate is postformable.

* * * * *